(12) United States Patent
Volokh et al.

(10) Patent No.: US 9,308,591 B2
(45) Date of Patent: Apr. 12, 2016

(54) OPTIMIZATION OF CUTTING EDGE GEOMETRY IN ROUNDED NOSE END MILLS

(76) Inventors: Vladimir D. Volokh, Maalot (IL); Leonid B. Sharivker, Naharya (IL); Sergei Boulakhov, Naharya (IL)

( * ) Notice: Subject to any disclaimer, the term of this patent is extended or adjusted under 35 U.S.C. 154(b) by 572 days.

(21) Appl. No.: 13/510,343

(22) PCT Filed: Nov. 16, 2010
(Under 37 CFR 1.47)

(86) PCT No.: PCT/US2010/056843
§ 371 (c)(1),
(2), (4) Date: Sep. 12, 2012

(87) PCT Pub. No.: WO2011/062901
PCT Pub. Date: May 26, 2011

(65) Prior Publication Data
US 2013/0051937 A1 Feb. 28, 2013

(30) Foreign Application Priority Data

Nov. 17, 2009 (IL) .......................................... 202196

(51) Int. Cl.
*B23C 5/10* (2006.01)
*B23C 5/00* (2006.01)
(52) U.S. Cl.
CPC ............. *B23C 5/1009* (2013.01); *B23C 5/1045* (2013.01); *B23C 2210/0407* (2013.01); *B23C 2210/0442* (2013.01); *Y10T 407/1924* (2015.01); *Y10T 407/1948* (2015.01)

(58) Field of Classification Search
CPC .. B23C 5/10; B23C 5/1009; B23C 2210/407; B23C 2210/0414; B23C 2210/0421
USPC ....................................................... 407/53, 54
See application file for complete search history.

(56) References Cited

U.S. PATENT DOCUMENTS

| | | | | |
|---|---|---|---|---|
| 4,381,162 A | * | 4/1983 | Hosoi | 408/1 R |
| 4,812,087 A | * | 3/1989 | Stashko | 407/42 |
| 4,940,369 A | | 7/1990 | Aebi et al. | |
| 5,071,292 A | | 12/1991 | Satran | |
| 5,486,073 A | | 1/1996 | Satran et al. | |
| 5,725,333 A | | 3/1998 | Abe et al. | |
| 5,855,458 A | * | 1/1999 | Reynolds et al. | 407/54 |
| 5,893,683 A | * | 4/1999 | Johnson | 407/42 |

(Continued)

FOREIGN PATENT DOCUMENTS

| | | |
|---|---|---|
| CN | 1055498 A | 10/1991 |
| CN | 1181031 A | 5/1998 |

(Continued)

OTHER PUBLICATIONS

World Intellectual Property Organization, "International Search Report", Jul. 21, 2011, 4 pp.

(Continued)

*Primary Examiner* — Will Fridie, Jr.
(74) *Attorney, Agent, or Firm* — Larry R. Meenan

(57) ABSTRACT

A rounded nose end-mill modified by optimization of geometrical parameters of both the rake angle and relief angle along the cutting edge of the rounded portion, wherein the rake angle and the relief angle gradually increase along the cutting edge from the full diameter of the rounded portion to the tip.

14 Claims, 9 Drawing Sheets

(56) References Cited

U.S. PATENT DOCUMENTS

| | | | |
|---|---|---|---|
| 6,082,935 A | 7/2000 | Hori | |
| 6,536,996 B2* | 3/2003 | Satran et al. | 407/34 |
| 6,846,135 B2* | 1/2005 | Kuroda et al. | 407/53 |
| 7,699,565 B2* | 4/2010 | Aoki | 407/53 |
| 7,878,739 B2* | 2/2011 | Maeda | 407/119 |
| 8,123,439 B2* | 2/2012 | Rouge et al. | 407/54 |
| 8,647,025 B2* | 2/2014 | Davis et al. | 407/54 |
| 8,858,128 B2* | 10/2014 | Budda et al. | 407/54 |
| 8,870,498 B2* | 10/2014 | Maeda et al. | 407/54 |
| 2003/0180104 A1 | 9/2003 | Kuroda et al. | |
| 2011/0211922 A1* | 9/2011 | Maeda et al. | 407/54 |
| 2011/0217132 A1* | 9/2011 | Wells et al. | 407/54 |
| 2013/0051937 A1 | 2/2013 | Sharivker et al. | |

FOREIGN PATENT DOCUMENTS

| | | |
|---|---|---|
| CN | 1042306 C | 3/1999 |
| CN | 101502894 A | 8/2009 |
| EP | 0 585 800 A1 | 3/1994 |
| JP | 253726 A | 9/1993 |
| JP | 06218612 | 8/1994 |
| JP | H10080815 A | 3/1998 |
| JP | 2005319558 A | 11/2005 |
| JP | 2007178612 A | 7/2007 |
| WO | WO/2011/062901 | 5/2011 |

OTHER PUBLICATIONS

Mar. 24, 2015 Notice of Allowance 5722909.
Feb. 28, 2015 Office action (2 months) 102596464A.
Aug. 21, 2015 Office action (2 months) 102596464A.
Sep. 2, 2014—Reasons_for_Rejection.

* cited by examiner

OPTIMIZATION OF CUTTING EDGE GEOMETRY IN ROUNDED NOSE END MILLS

FIELD OF THE INVENTION

The present invention relates to rounded nose end mills, more particularly to optimization of rake and relief angles along the rounded portion of rounded nose end mills.

BACKGROUND OF THE INVENTION

A typical ball nose, end mill such as shown in FIG. 1, generally referenced 10, includes a shank 12, straight or conical cutting portion 14 and rounded cutting portion 16. The cutting speed at the rounded portion 16 of a ball nose end mill is gradually decreasing from the full diameter 18 of the ball towards the tip 20. The cutting speed is directly related to the diameter and can be expressed, with reference to FIGS. 2 and 3, by the equation $V=N\pi D\sin\theta$. Where V is the cutting speed or tangential velocity (meters per second), N is the rotation speed (turns per second), D the full diameter 18 (meters) and $\theta$ (referenced 21) is the angle between the longitudinal center line 22 of the tool and any line 24 extending from the center point 26 of the rounded cutting portion 16 to a measured point 28 on the cutting edge 29.

Accordingly the cutting speed is related to the angle $\theta$ by the sinusoidal equation, meaning that velocity is near zero adjacent the center of the tool, rapidly increasing in the range of $0°<\theta<30°$ wherein for $\theta=30°$ the speed V is half of the maximal speed, and slowly increasing in the range of $30°<\theta<90°$ to the maximal speed at the full diameter 18 of the rounded portion 16.

The cutting edge geometry as viewed in FIG. 4 (a sectional view taken along line A-A of FIG. 3), depicts the rake angle 30, wedge angle 32, and relief angle 34, usually represented by the Greek letters $\alpha$, $\beta$, $\gamma$ respectively.

Solid High-Speed Steel (HSS) and carbide tools traditionally finished by the grinding process, typically have constant rake, wedge and relief angles along the cutting edge 29 of the rounded portion 16. As a result, each A-A section as in FIG. 3 taken at different $\theta$ values will have the same angles $\alpha$, $\beta$, $\gamma$.

Modern grinding techniques permit more flexibility in shaping the relief angle. An example is suggested in U.S. Pat. No. 5,558,475, disclosing a tool with constant positive rake angle $\alpha$ of size $+8°\pm2°$ along the whole radius and a continuous, dimension depending decreasing clearance (relief) angle $\gamma$ between $17°\pm2°$ to $10°\pm2°$ towards the center. The rake and clearance angles are measured in a plane perpendicular to the cutting edge. In a preferred embodiment of the above patent, a ball nose end mill has a decreasing clearance angle from $15°$ to $10°$ from the periphery to the center.

The introduction of disposable carbide inserts to ball nose and bull nose end mills has permitted even more complex structures. Such a structure is described for example in U.S. Pat. No. 6,024,519, disclosing a throwaway insert for a ball end mill with sloped rake faces, whereby the farther away from the noses, the steeper the rise of the rake faces from the groove. Thus, the nearer to the side where the cutting speed is higher, the greater the rake angle.

A specific example given in the above patent is a tool having at its periphery rake angle $\alpha$ between $5°$-$25°$ and wedge angle $\beta$ of $85°$-$65°$, the relief angle $\gamma$ being minimal. Thus, the rake angles at any longitudinal portions of the cutting edge are all positive except the nose portions, wherein the rake angle $\alpha$ is negative.

However, for a tool intended for multi-axis CNC machining with fast horizontal feed rates, a negative or even zero rake angle adjacent the tip 20, exerts very high forces on the machine, the tool and the workpiece. This will he better understood with reference to FIGS. 4 and 5 showing sectional views taken along lines A-A and B-B of FIG. 3, Section B-B taken along a horizontal line parallel to the horizontal feed of the machine represents the actual working section when horizontal feeds are involved. It will be recognized by a person skilled in the art of trigonometry that positive rake and relief angles $\alpha$, $\gamma$, respectively, as viewed in cross-section along a radial line to any point 28 along the cutting edge 29 (as shown in FIG. 4), will appear smaller ($\alpha 1<\alpha$, $\gamma 1<\gamma$) when viewed in a section parallel to the horizontal through same point 28 along the cutting edge 29, as shown in FIG. 5.

Thus, the combination of low cutting speed adjacent to the tip 20 of the tool with the geometrically reduced horizontal feed rake and relief angles as explained above exerts elevated cutting forces, heat and rough surface quality.

In an experimental research made by the present applicant, it has been shown that further optimization of the cutting edge geometry provides better performance, surface quality and extended life of the tool.

SUMMARY OF THE INVENTION

It is thus an object of the present invention to provide optimization of the rake and relief angles along the rounded portion of rounded nose end mills, further improving tool performance.

It is another object of the present invention to provide a general solution that is equally applicable for different workpiece materials.

These objects are achieved according to one embodiment of the present invention, by providing a rounded nose end-mill modified by optimization of geometrical parameters of both the rake and relief angles, along the cutting edge of the rounded portion, wherein the rake angle and the relief angle gradually increase along the cutting edge from the full diameter of the rounded portion to the tip.

The increase rate of the rake or relief angles along the cutting edge in relation to the angular position, may be expressed by a term chosen from the list of, linearly, cubically, exponentially, logarithmically, conforming to any other mathematical expression, and defined by a tabulated collection of values linked by linear interpolation.

Furthermore, the increase of rake and relief angle is not limited to specific values but comes in addition to an initial value as would typically have been specified for an equivalent unmodified tool for the same workpiece material.

BRIEF DESCRIPTION OF THE DRAWINGS

In order to understand the invention and to see how it may be carried out in practice, embodiments will now be described, by way of non-limiting example only, with reference to the accompanying drawings, in which.

DETAILED DESCRIPTION OF EMBODIMENTS

With reference to the drawings, it should be noted that the accompanying drawings represent the tool cutting geometry in general terms, hence they equally apply in demonstration of prior art as well as the new art as proposed by the present invention.

Figure 1:
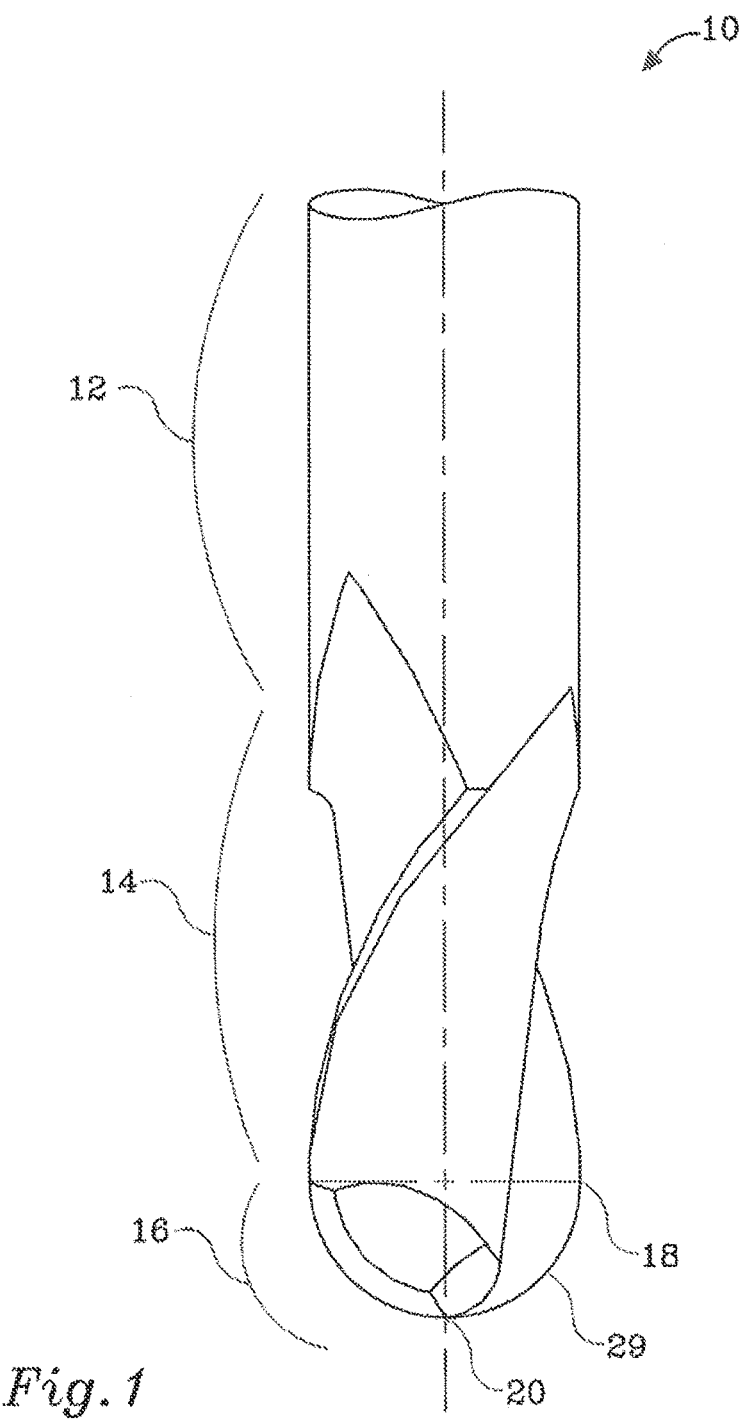
FIG. 1 is a front view of a standard ball-nose end-mill.
Figure 2:
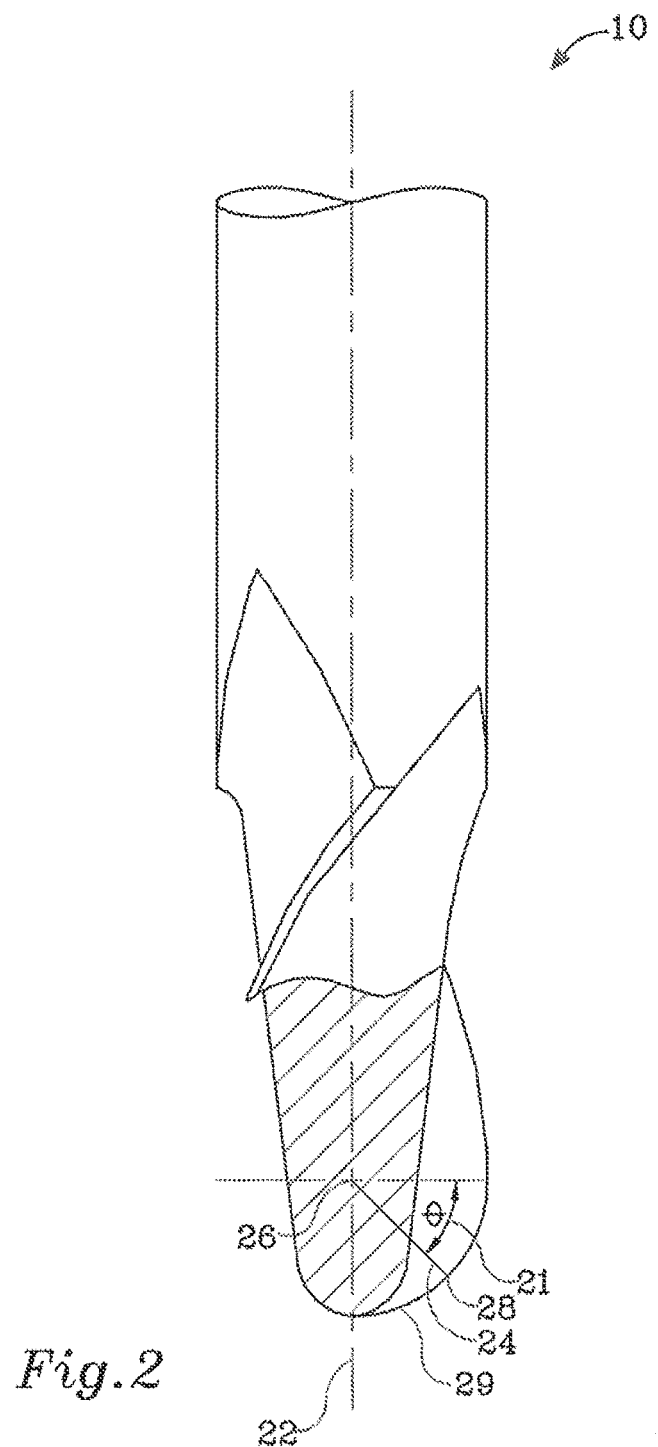
FIG. 2 is a partial sectional view at the rounded portion of an end-mill as in FIG. 1.
Figure 3:
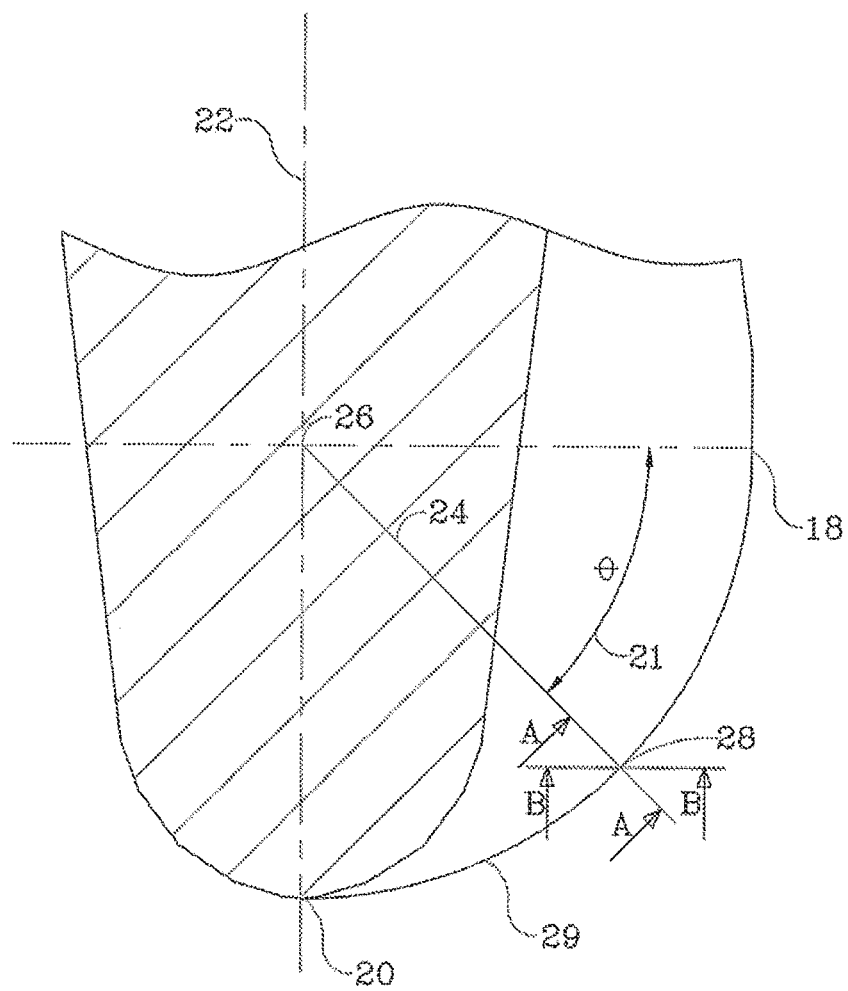
FIG. 3 is an enlarged sectional view of the rounded portion of an end-mill as in FIG. 2.
Figure 4:
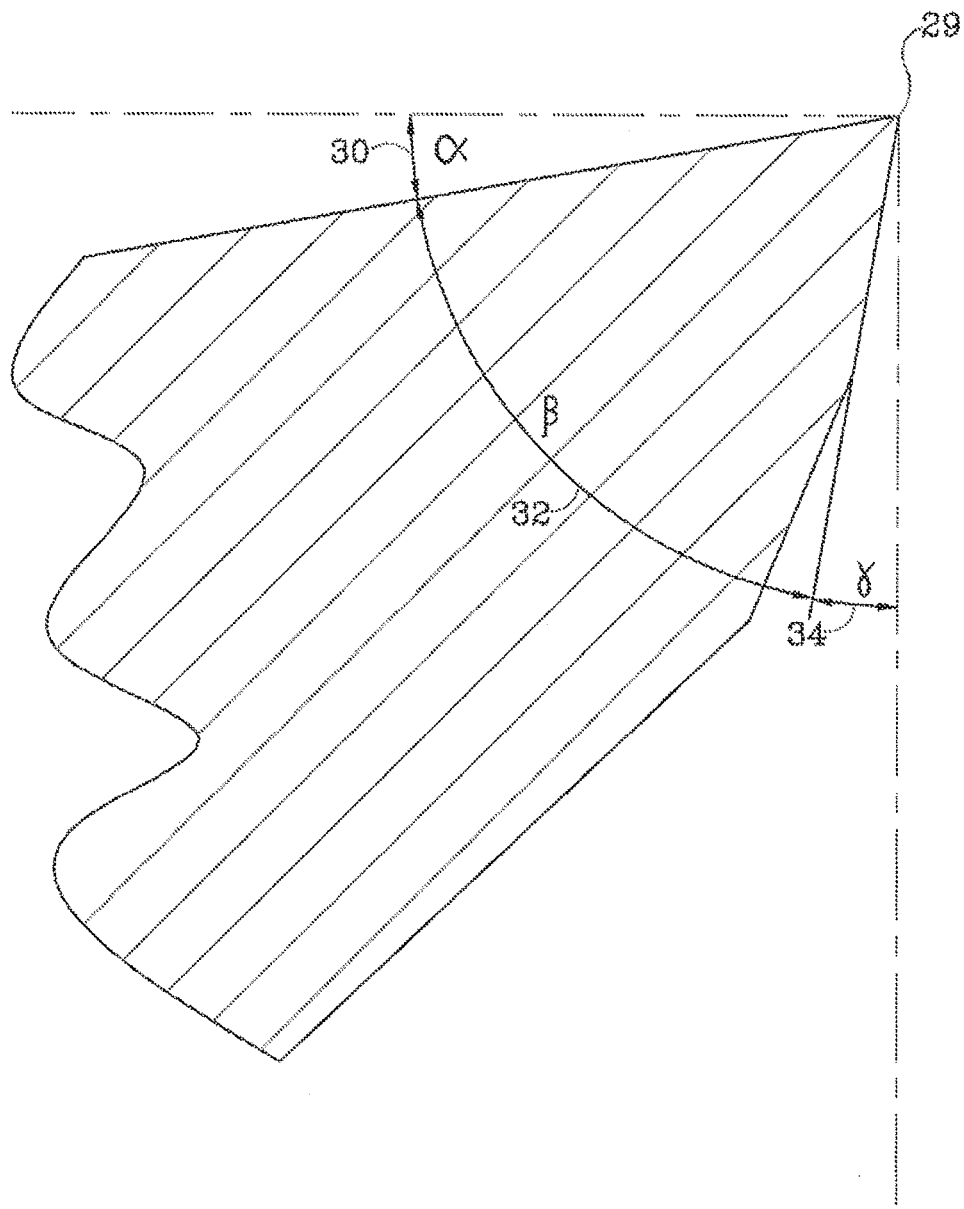
FIG. 4 is an enlarged cross-sectional view taken along line A-A in FIG. 3, showing the cutting geometry along a radial line.
Figure 5:
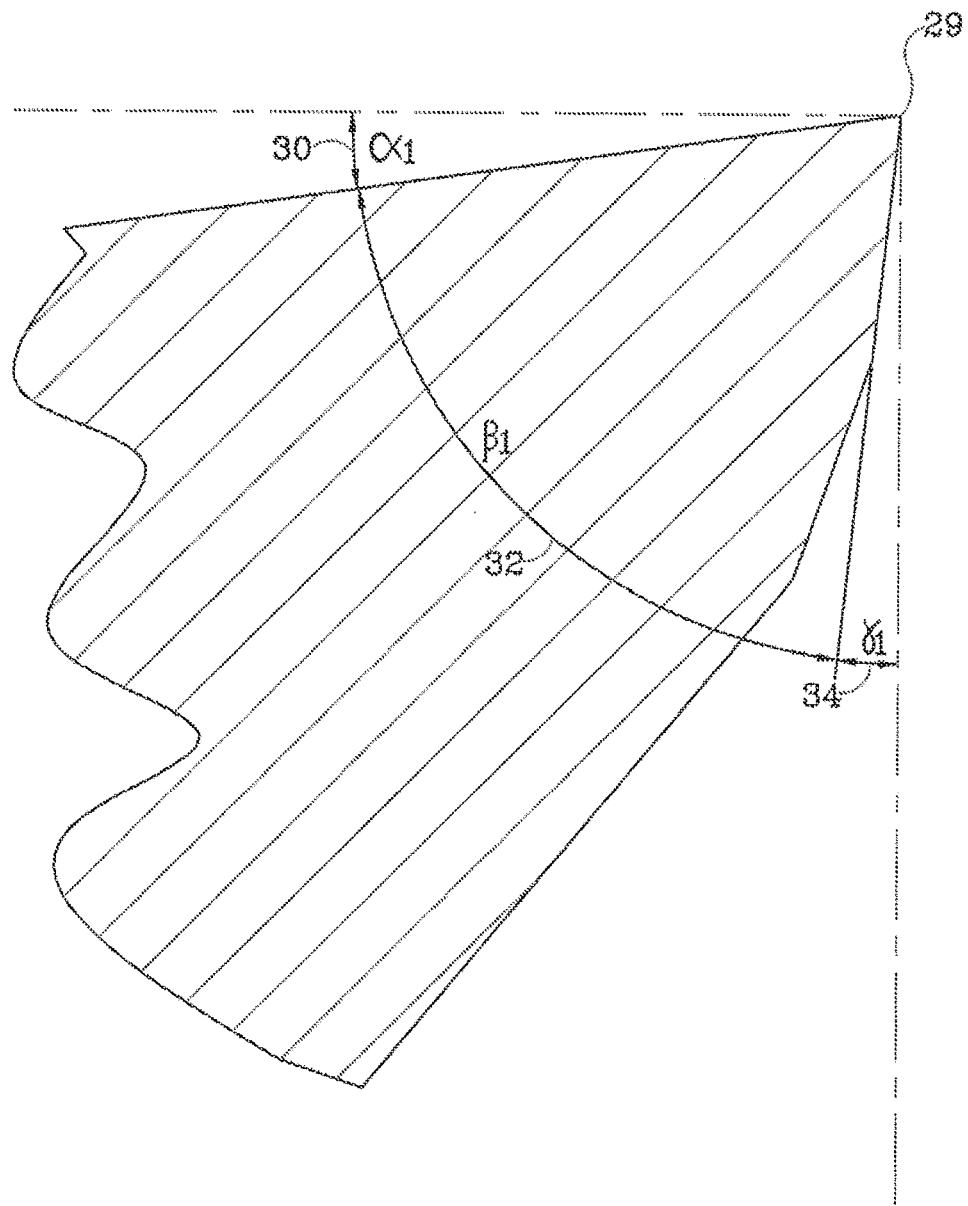
FIG. 5 is an enlarged cross-sectional view taken along line B-B in FIG. 3, showing the cutting geometry along a horizontal line.

According to the present invention there is provided a rounded nose end-mill generally referenced 10 (FIG. 1), modified by optimization of geometrical parameters of both the rake 30 ($\alpha$) and relief 34 ($\gamma$) angles (FIG. 4), along the cutting edge 29 of the rounded portion 16 (FIG. 1). Since the wedge angle 32 ($\beta$) is the 90° complement of the sum of the rake 30 ($\alpha$) and the relief 34 ($\gamma$) angles i.e. ($\beta=90°-(\alpha+\gamma)$), it will not be considered below.

In a first embodiment of the invention, the rake angle 30 ($\alpha$) and the relief angle 34 ($\gamma$) gradually increase along the cutting edge 29 from the full diameter 18 where for a straight cutting portion 14, $\theta=90°$, to the tip 20 where $\theta=0°$. The total amount of increase of the rake angle 30 ($\alpha$) is in the range of 1° to 10°, and the total amount of increase of the relief angle 34 ($\gamma$) is in the range of 1° to 15°.

For example a ball-nose end-mill according to this embodiment may be provided with a rake angle of 10° at $\theta=90°$ gradually increasing along the cutting edge to 15° at $\theta=0"$ and a relief angle of 5° at $\theta=90°$ gradually increasing along the cutting edge to 12° at $\theta=0°$.

It will be understood that the increase rate of the rake or relief angles along the cutting edge 29 with relation to the angle $\theta$ may be expressed linearly, cubically, exponentially, logarithmically, or may conform to any other mathematical expression, or be defined by a tabulated collection of values linked by linear interpolation.

The principle of the invention is not limited to a specific workpiece material, the increase of rake and relief angles comes in addition to the initial value as would have originally been specified for the same workpiece material. For example it is known to apply higher rake and relief angles when machining soft materials such as aluminum and lower rake and relief angles when machining steels. Accordingly a typical ball-nose end-mill for machining aluminum according to the first embodiment may have a rake angle of 15° at $\theta=90°$ gradually linearly increasing along the cutting edge 29 to 22° at $\theta=0°$ and a relief angle of 10° at $\theta=90°$ gradually linearly increasing along the cutting edge 29 to 20° at $\theta=0°$. A typical bail-nose end-mill for machining steel according to the first embodiment may have a rake angle of 5° at $\theta=90°$ gradually exponentially increasing along the cutting edge 29 to 10° at $\theta=0°$ and a relief angle of 4° at $\theta=90°$ gradually linearly increasing along the cutting edge 29 to 12° at $\theta=0°$.

Figure 6:
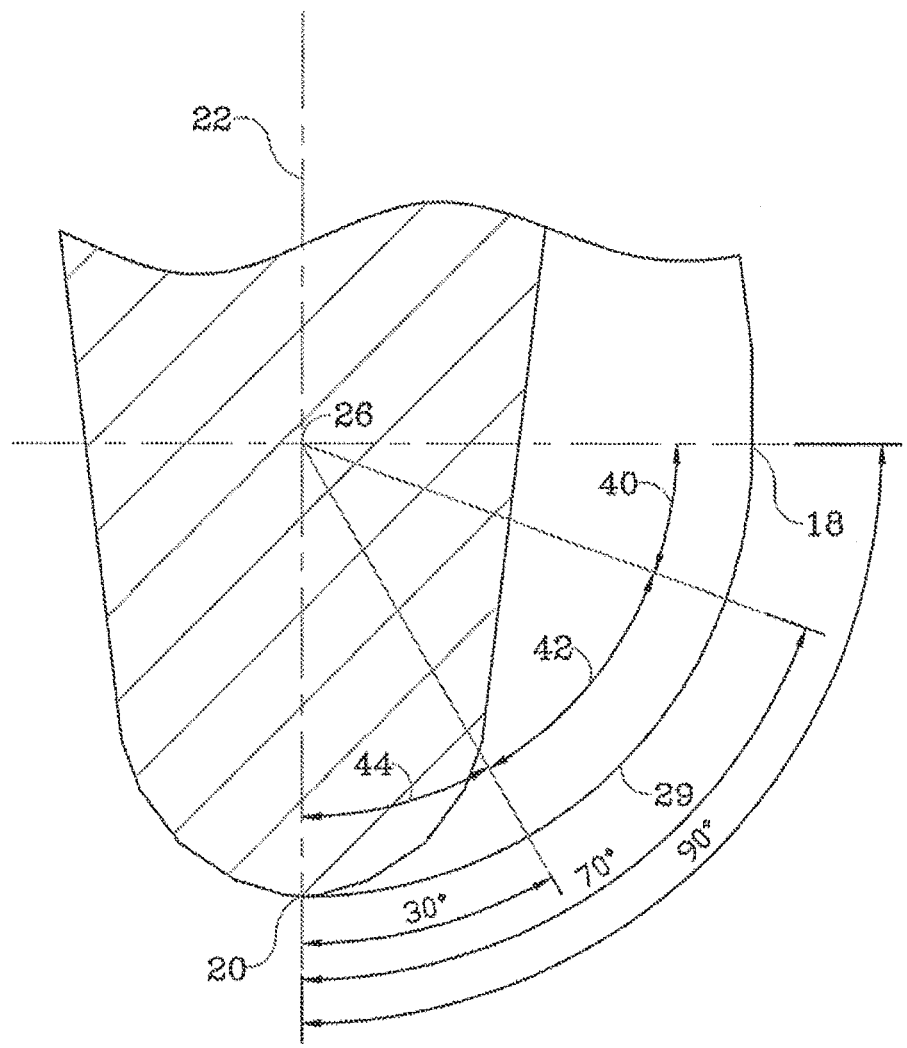
FIG. 6 is an enlarged sectional view of the rounded portion of an end-mill as in FIG. 3, according to a second embodiment.

In a second embodiment of the invention, the cutting edge 29 are is divided into at least two individual circular sectors. For example with reference to FIG. 6, three sectors are defined, a first sector 40 for the range $90°>\theta>70°$, a second sector 42 for the range $70°>\theta>30°$ and a third sector 44 being defined for the range $30°>\theta>0°$. For each of the sectors 40, 42, 44, a different amount of increase of the rake 30 and relief 34 angles is applied. For example, along the first sector 40, the total increase of the rake angle 30 may be in the range of 0° to 1°, along the second sector 44, the total increase of the rake angle 30 may be in the range of 0.5° to 3°, and along the third sector 44, the increase in the rake angle 30 may be in the range of 2° to 10°. Accordingly along the first sector 40 the relief angle 34 increases in the range of 0° to 2°, along the second sector 44, the relief angle 34 increases in the range of 1° to 5°, and along the third sector 44, the relief angle 34 increases in the range of 3° to 15°.

Figure 7:
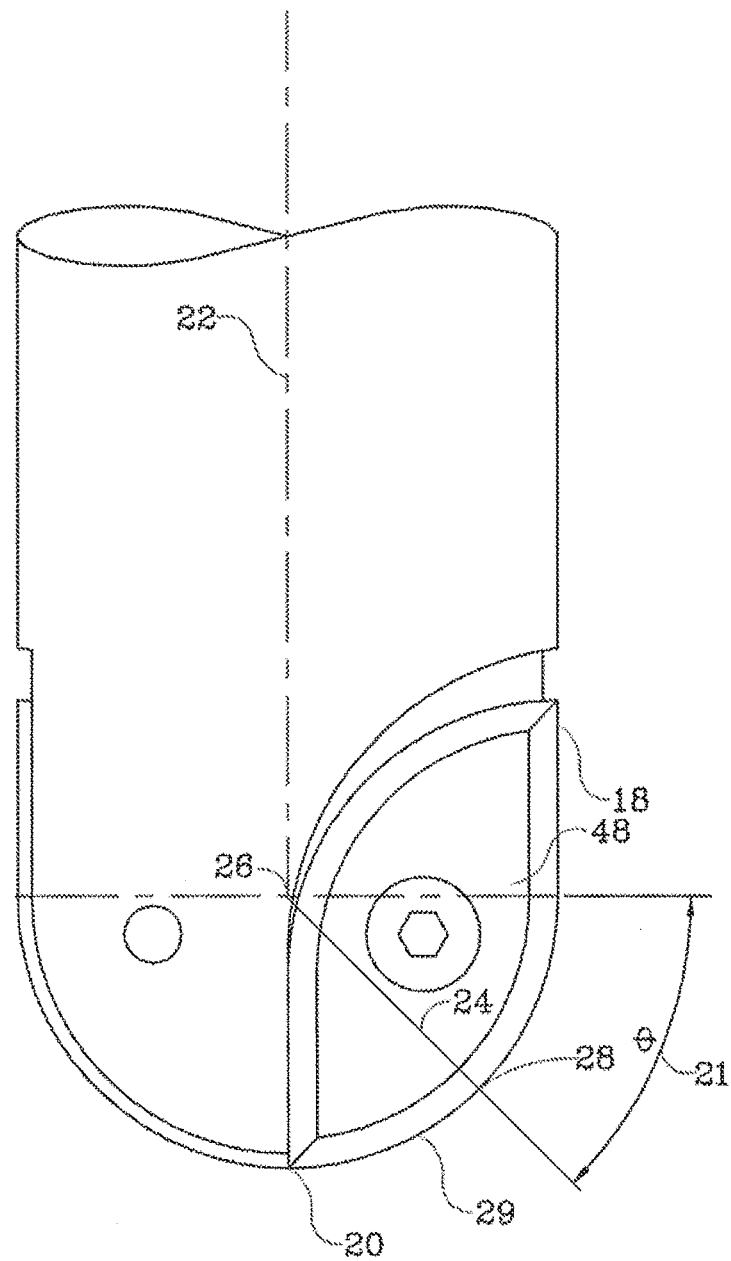
FIG. 7 is a front view of a ball-nose end-mill equipped with replaceable carbide inserts.

The present invention is not limited to solid MSS or carbide tools as described above with reference to FIGS. 1 to 6, but is also applicable to the same extent for ball-nose end-mills with other suitable cutting tool materials such as ceramic as well as those equipped with brazed or replaceable disposable inserts of suitable cutting tool materials. For example, FIG. 7 shows a ball-nose end-mill equipped with brazed or replaceable disposable carbide inserts 48, typically having a small or zero flute helix angle.

Figure 8:
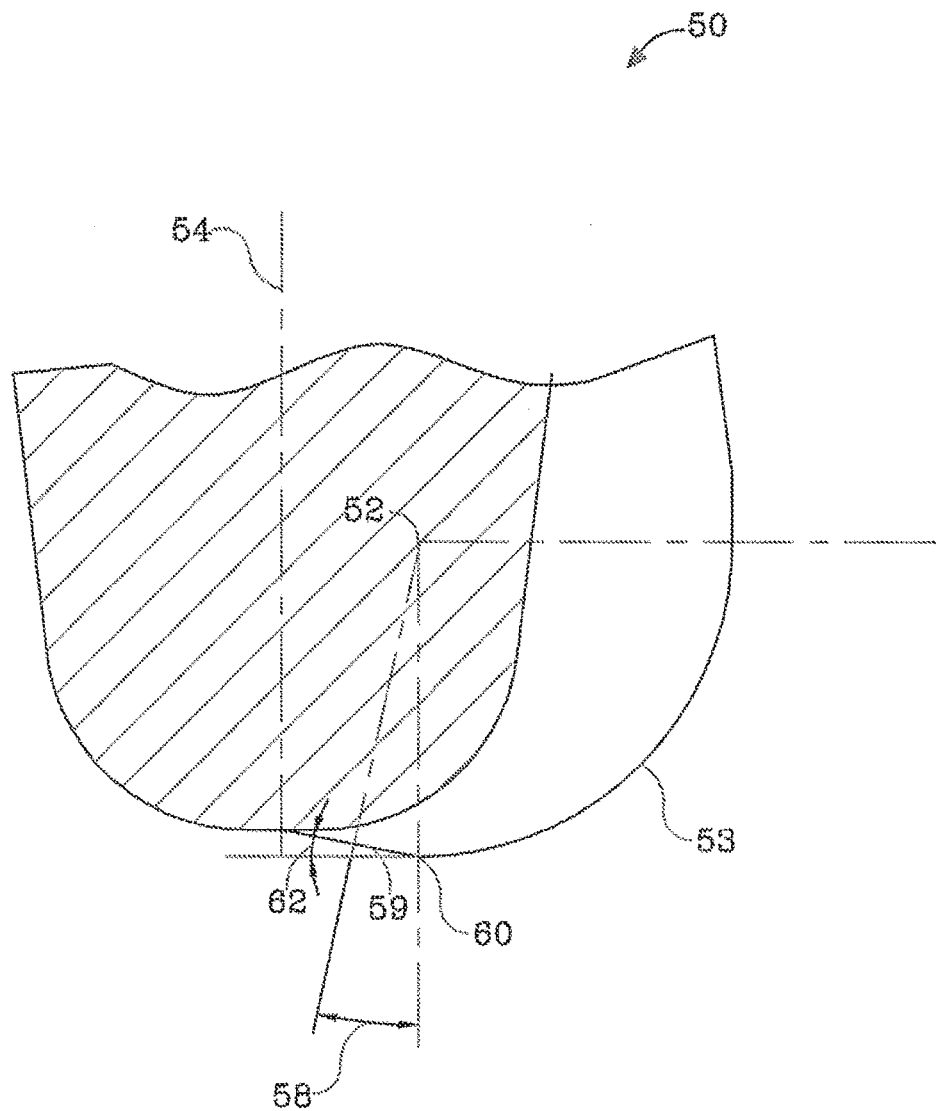
FIG. 8 is an enlarged cross-sectional view as in FIG. 3 of a bull-nose end-mill.
Figure 9:
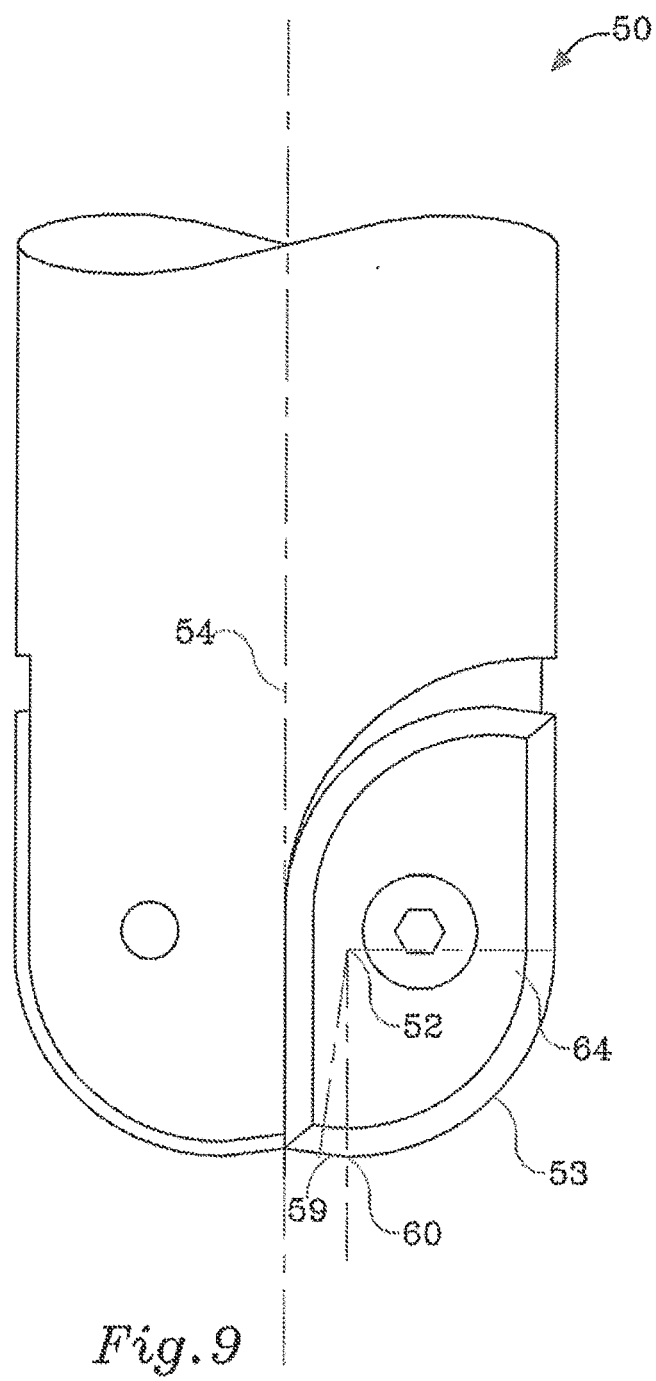
FIG. 9 is a front view of a bull-nose end-mill equipped with replaceable carbide inserts.

With reference to FIGS. 8 and 9, the rounded portion of a bull-nose end-mill generally referenced 50 is shown, wherein the center 52 of the cutting edge 53 arc is out of the rotation axis 54 of the tool 50. The principles of the present invention according to the first and the second embodiments are applicable in the same way along the cutting edge 53 arc, for positive values of $\theta$. However an additional circle sector 58, preferably in the range of 0° to 5° is further defined. According to a third embodiment of the invention, related to a bull-nose end-mill, the additional sector 58 which is in the negative portion of the angle $\theta$ but still subject to the same range of $0°>\theta>-5°$, is provided with a straight cutting edge 59 rising from the lowest contact point 60 on the cutting edge 53, towards the rotation axis 54 of the tool 50, at an angle 62, which may be in the range of 0° to 2°.

The cutting geometry along the cutting edge 59 of the additional sector 58, preferably follows the rake and relief angles as defined for $\theta=0°$ with reference to the first and second embodiments as described above. This third embodiment is equally applicable to solid HSS or carbide tools as shown in FIG. 8, as well as tools with brazed or replaceable disposable inserts 64 as shown in FIG. 9.

While the invention has been described with reference to a two flute cylindrical end-mill, the same principles are applicable to other rotary cutters with one, three, four, five or any number of flutes evenly or unevenly spaced on the perimeter circle, as well as other cutter shapes such as conical, spherical or multi teeth face cutters, all of which fall within the scope of the claims.

It will be evident to those skilled in the art that the invention is not limited to the details of the foregoing illustrated embodiments and that the present invention may be embodied in other specific forms without departing from the spirit or essential attributes thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein.

The invention claimed is:

1. A rounded nose end-mill comprising:
 a shank having a rounded cutting portion disposed at an end thereof, the shank having an outer diameter, the rounded cutting portion including at least one rounded cutting edge extending from the outer diameter toward a tip of the shank and having a rake angle and a relief angle, wherein the rake angle is non-negative and gradually increases, without decrease, along the rounded cutting edge from the outside diameter to the tip, and wherein the relief angle gradually increases along the rounded cutting edge from the outer diameter to the tip.

2. The rounded nose end mill of claim 1, wherein a total amount of increase of the rake angle is in the range of 1° to 10°, and a total amount of increase of the relief angle is in the range of 1° to 15°.

3. The rounded nose end mill of claim 1, wherein a rate of increase of the rake or relief angles along the cutting edge in relation to the angular position is a function chosen from the list comprising: linearly, cubically, exponentially, logarithmically, or conforms to any other mathematical expression, or is defined by a tabulated collection of values linked by linear interpolation.

4. The rounded nose end mill of claim 1, wherein the increase of rake and relief angle is in addition to an initial value of one or both of the rake and relief angles.

5. The rounded nose end mill of claim 1 wherein the cutting edge is divided into at least two individual sectors, and wherein the rake and relief angles increase different amounts in each sector.

6. The rounded nose end mill of claim 1, wherein the end-mill is made of solid HSS or carbide or ceramic.

7. The rounded nose end mill of claim 1, wherein the end-mill comprises brazed or replaceable throwaway carbide inserts.

8. The rounded nose end mill of claim 1, wherein the tip of the shank is offset from a rotational axis of the end mill.

9. The rounded nose end mill of claim 8, wherein the cutting portion comprises a straight cutting edge extending back from the tip toward the rotational axis of the end mill at an angle in the range of 0° to 2° with respect to a plane disposed perpendicular to the rotational axis of the end mill.

10. The rounded nose end mill of claim 9, wherein the cutting geometry along the straight cutting edge, follows the rake and relief angles of the rounded cutting edge as defined at the tip.

11. The rounded nose end mill of claim 9, wherein the end-mill is made of solid HSS or carbide or ceramic.

12. The rounded nose end mill of claim 9, wherein the end mill comprises brazed or replaceable throwaway carbide inserts.

13. The rounded nose end mill of claim 1 wherein the shank further comprises one or more flutes formed therein, the one or more flutes being spaced evenly or unevenly about the shank.

14. The rounded nose end mill of claim 1 comprising a rotary cutter shape that is one of straight, conical, or spherical.

\* \* \* \* \*